United States Patent

[11] 3,628,315

| [72] | Inventor | Robert W. Bartholomew |
| | | 318 Hickory St., Michigan City, Ind. 46360 |
| [21] | Appl. No. | 64,192 |
| [22] | Filed | Aug. 17, 1970 |
| [45] | Patented | Dec. 21, 1971 |

[54] MOWER SAFETY DEVICE
8 Claims, 5 Drawing Figs.

[52] U.S. Cl. ..................................................... 56/10.5, 56/11.6
[51] Int. Cl. ..................................................... A01d 35/26
[50] Field of Search ........................................... 56/10.5, 10.1, 11.6, 11.7, 14.7

[56] References Cited
UNITED STATES PATENTS
| 2,865,159 | 12/1958 | Musgrave | 56/14.7 |
| 3,169,358 | 2/1965 | Ertsgaard et al. | 56/10.5 |
| 3,229,452 | 1/1966 | Hasenbank | 56/10.5 |

Primary Examiner—Russell R. Kinsey
Attorney—Eugene E. Geoffrey, Jr.

ABSTRACT: A safety device for controlling the delivery of power to the cutting blades of a riding mower having means thereon movable from a first position to a second position under the weight of an operator and back to the first position upon removal of the weight of the operator. The safety device comprises force applying means associated with the means movable by the operator and with a clutch which controls the transmission of power to the cutting means, the force applying means being effective to apply a force to disengage the clutch and halt the transmission of power to the cutting blades only upon removal of the weight of the operator.

PATENTED DEC 21 1971

INVENTOR
ROBERT W. BARTHOLOMEW
BY
ATTORNEY

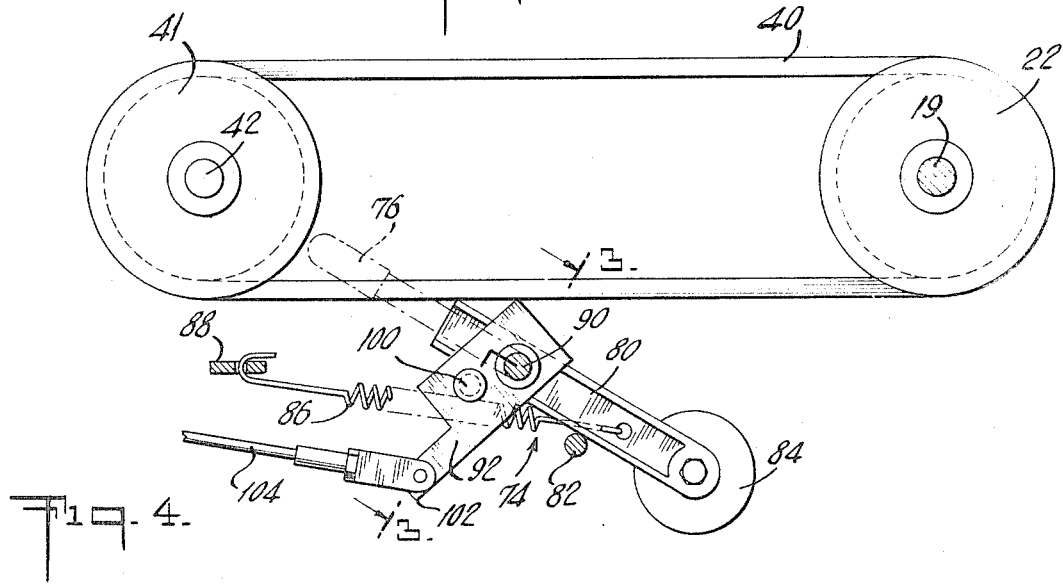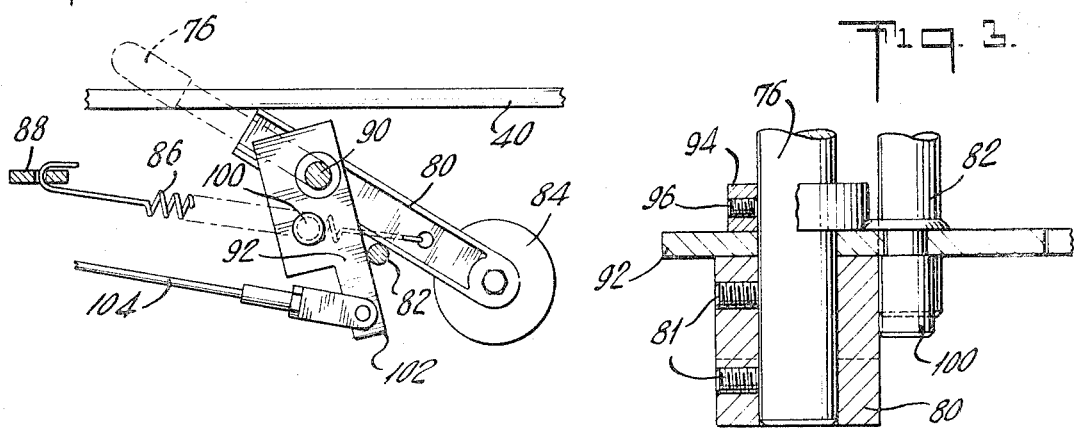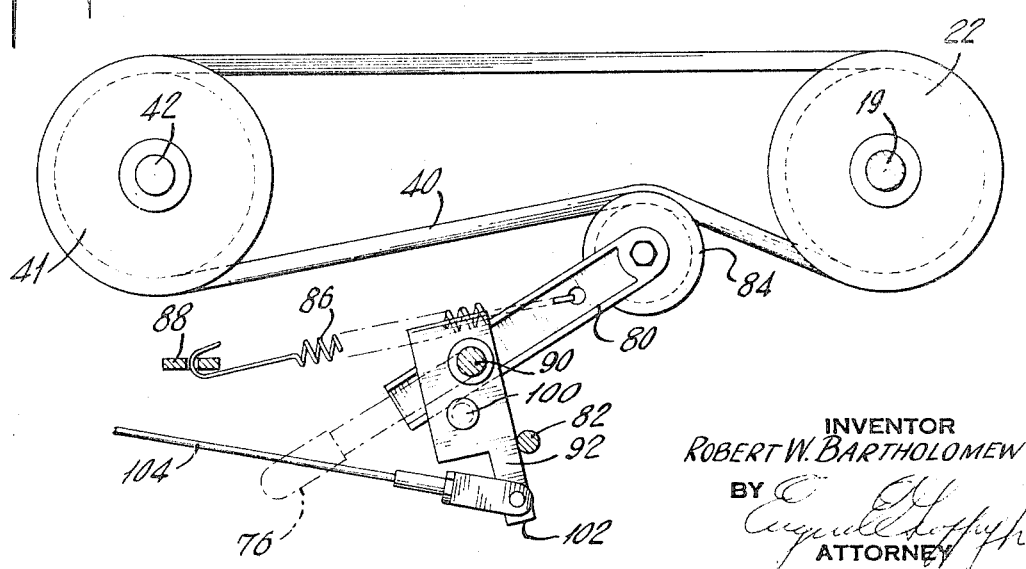

MOWER SAFETY DEVICE

This invention relates to safety devices for mowers and more specifically to a novel and improved automatic safety device for use on riding mowers.

In accordance with the present invention, the riding mower is provided with a clutch mechanism operable to transmit power between a power source and the mower cutting blades only when the operator is in position on the mower. Since operators frequently leave the mower without shutting off the power source or are accidentally thrown therefrom, the cutting blades of the mower if not shutoff can present a real hazard to the safety of the operator. To prevent the transmission of power to the cutting blades when the operator is not in position on the mower, force applying means are provided to control the operation of the clutch mechanism. The force applying means are rendered inoperative to affect the transmission of power to the cutting blades when the operator is in position on the mower and rendered operative to apply a force to disengage the clutch and cut power to the blades if the operator leaves or is thrown from the mower.

For best results, the force applying means is connected to the operator's seat, the seat being movable by the weight of the operator from a first position in which the clutch is disengaged by the force applying means to a second position in which the force applying means in inoperative to prevent engagement of the clutch. Spring means are provided between the seat and the mower to move the seat to the first position if the operator leaves the seat which automatically activates the force applying means and disengages the clutch.

For best results, the force applying means is connected to the operator's seat, the seat being moveable by the weight of the operator from a first position in which the clutch is disengaged by the force applying means to a second position in which the force applying means is inoperative to prevent engagement of the clutch. Spring means are provided between the seat and mower to move the seat to the first position if the operator leaves the seat which automatically activates the force applying means and disengages the clutch.

The above and other objects of the invention will become more apparent from the following description and accompanying drawings forming part of this application.

In the drawings:

FIG. 2 is a cross-sectional view of FIG. 1 taken along the line 2—2 thereof and showing the clutch operating means in the disengaged position;

FIG. 3 is a detailed sectional view of a portion of the clutch operating means of the instant invention taken along the line 3—3 of FIG. 2;

FIG. 4 is a detailed top plan view of the clutch operating means of the invention with the force applying means rendered ineffective;

FIG. 5 is a top plan view in detail of the clutch and clutch operating means of the instant invention and showing the engaged position of the clutch operating means.

Figure 1:
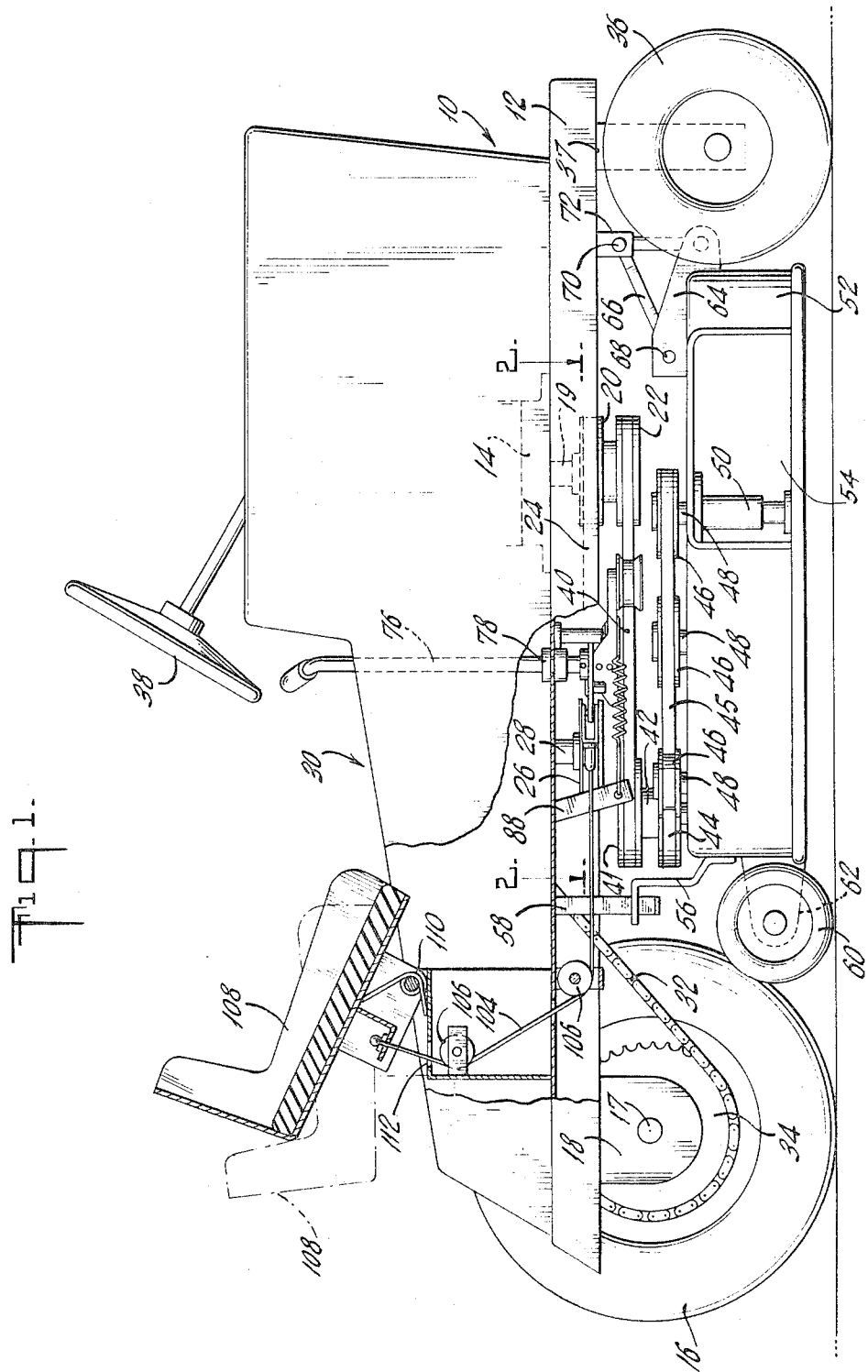
FIG. 1 is a side elevational view in partial section of a riding mower showing one embodiment of a safety device in accordance with the invention.

Referring now to the drawings, the riding mower is generally denoted by the numeral 10. The mower 10 has a platform or base 12 on which a power source 14 such as a gasoline engine is mounted for driving the rear wheels 16. The rear wheels 16 are mounted for rotation on a shaft 17 which shaft is in turn carried by a pair of flanges 18.

A power source 14 has an output shaft 19 extending therefrom which carries a pair of pulleys 20 and 22. Pulley 20 is drivingly connected by a V-belt 24 to a driven pulley 26 which is in turn connected by a shaft 28 to a transmission enclosed within the housing 30. A drive chain 32 connects the transmission to a sprocket 34 which turn drives the rear wheels 16 directly or through a suitable differential.

The mower is provided with at least one steerable wheel 36 rotatably carried by a support 37 which is in turn mounted on the base 12. The steerable wheel 36 is controlled by movement of a steering wheel 38 which is coupled thereto by a suitable steering assembly (not shown).

The pulley 22 carried by the shaft 19 supplies power through a V-belt 40 to a driven pulley 41. Pulley 41 is connected by a shaft 42 to a pulley 44 positioned below the driven pulley 41. The pulley 44 is connected by a V-belt 45 to a plurality of pulleys 46, each of which is connected by a shaft 48 to the hub 50 (only one of which is shown) of an equal number of rotatable cutting blades. The cutting blades are mounted in a housing 52 which is provided with an opening 54 therein through which cut grass and other debris is expelled in a conventional manner.

The rear portion of housing 52 is provided with a bracket 56 which slidably engages a slotted arm 58. The bracket 56 slidably engages the V-shaped arm 58 to permit a limited amount of horizontal and vertical movement of the housing 52 to permit adjustment of the tension in the V-belt 40. Trailing wheels 60 are mounted on the rear of the housing 52 by brackets 62. The trailing wheels support the housing 52 as the mower moves, and the housing 52 and the blades 51 are free to move up and down to clear irregularities in the surface being mowed.

The front portion of the housing 52 is carried by a bracket 64 which has a link 66 pivotally secured thereto by a pivot pin 68. In addition, the link 66 is pivotally mounted at 70 to an arm 72 which in turn is secured to the frame 12. Conventional means (not shown) are provided to move the bracket 64, and consequently the housing 52 horizontally to provide adjustment of the tension of V-belt 40 to the extent permitted by the post 58 and bracket 66. In addition, an adjustable link 74 is provided which couples the bracket 64 to the arm 72 to provide a vertical adjustment capability for the front end of the housing 52.

Power is delivered to the cutting blades by pulley 22, V-belt 40 and pulley 41, and constitute a clutch mechanism. The distance between pulleys 22 and 41 is set by moving the bracket 64 to move the housing 52 to adjust the tension in V-belt 40 such that the V-belt 40 is normally loose on the pulleys. With the V-belt 40 loose on the pulleys, power will not be transmitted to the cutting blades. The position of the V-belt when loose in the instant embodiment is shown in FIG. 2. To transmit power to the cutting blades, the slack in the V-belt 40 must be removed, and this is effected by depressing one side of the V-belt with a clutch operating device generally denoted by the numeral 74.

The clutch operating device includes an operating handle 76 rotatably carried by a collar 78 mounted on frame 12 (FIG. 1). The handle 76 extends through the collar 78 and is fixedly mounted to a pivotable link 80 by setscrews 81. The maximum position of the link 80 away from the V-belt 40 is governed by a stop 82 fixedly mounted on the frame 12. An idler roll 84 is carried by the link 80 for applying pressure to depress the V-belt 40. A spring 86 is secured at one end to the link 80 forward of the link pivot axis 90 and at the other end to a fixed arm 88. The mounting of the spring 86 forward of the link pivot forms a toggle mechanism to maintain the link 80 in one or the other of the positions shown in FIG. 2 and FIG. 5. This can be readily seen in FIGS. 2 and 5 where the position of the spring 86 is one one side of the pivot axis in the position of the link shown in FIG. 5 to cause the link to hold the pulley 84 in contact with the V-belt and on the other side of the pivot axis as shown in FIG. 2 to hold the pulley 84 out of contact with the V-belt 40.

A safety control plate 92 is pivotally mounted on handle 76. The control plate is maintained in position on the handle 76 by a collar 94 which is fixedly mounted by setscrews 96 on the shaft 76. The control plate 92 includes a post 100 which may be riveted or otherwise secured to the plate 92. A cable 104 is pivotally secured to an extension 102 forming part of plate 92 and the cable extends rearwardly and upwardly about a pair of idler rolls 106 (FIG. 1) and is pivotally attached to the operator's seat 108.

Disposed between the seat 108 and the mower body 112 is a torsion spring 110 which pivots the seat to the position shown in FIG. 1 whenever the operator is not in position thereon. With the seat in this position, the cable 104 is pulled taut by the spring 110. The taut cable exerts a pivoting force on control plate 92 to rotate it clockwise to bring the post 100 into abutment with link 80, thereby causing a clockwise movement (as viewed in FIG. 1) to be exerted on the link 80 about its pivot axis. If the link 80 is in the position shown in FIG. 2, the cable 104 will apply enough additional force to make it difficult for the operator to move the handle 76 to rotate the link into position against the V-belt and even if the link 80 is moved to the position shown in FIG. 5, it will be immediately returned to the disengaged position shown in FIG. 2.

With the seat moved to the dotted line position shown in FIG. 1 by the weight of the operator, the handle 76 can be rotated by the operator to bring pulley 84 into contact with the V-belt 40 to engage the clutch. The cable 104 is then inoperative to apply a force to the control plate 92, and it can be appreciated that the pressure exerted by the link 80 on the V-belt 40 to effect transmission of power to the cutting blades will be independent of the weight of the operator. However, if the operator should for any reason leave the seat after the link has been moved to the position shown in FIG. 5, the spring 110 will move the seat 108 to the position shown in full in FIG. 1. This will pull the cable 104 taut and the force applied by the cable to the control plate 92 will be sufficient to pivot the link away from the V-belt to the position shown in FIG. 2 to disengage the clutch mechanism and halt the transmission of power to the cutting blades. Thus the force exerted by the pulley 84 against the belt 40 is determined solely by the characteristics of spring 86 and is wholly independent of the weight of the operator.

If desired, a conventional microswitch (not shown) may be mounted in association with the seat to shut down the power source when the seat is in the position shown in FIG. 1.

Although a torsion spring and a pivotable seat are used in the description of the preferred embodiment, it is to be understood that a conventional coil spring may be used in conjunction with a vertically reciprocable seat in place of the pivotable seat and torsion spring described above.

While only one embodiment of the invention has been illustrated and described, it is apparent that alterations, modifications and changes may be made without departing from the true scope and spirit of the invention as defined in the appended claims.

What is claimed is:

1. A self-propelled riding mower having at least three wheels, a source of motive power for driving at least one of said wheels, rotary cutting means carried by said mower and an operator's seat, clutch means for coupling and decoupling the source of power from said cutting means, clutch operating means for controlling the said clutch means, said clutch operating means comprising a link adapted to be pivoted between a first position in which said link effects engagement of said clutch means to permit the transfer of power to said cutting means and a second position in which said link effects disengagement of said clutch means to interrupt the transfer of power to said cutting means, means for maintaining said link in said first position when the link is moved to the first position, force applying means connected to said link and associated with said seat, said force applying means being operative to apply a force to said link only when the seat is unoccupied by an operator, said force being sufficient to pivot said link to said second position to interrupt the transmission of power to said cutting means whereby said maintaining means will hold said link in said second position.

2. A mower according to claim 1 wherein said means for maintaining said link in a selected position comprises a spring connected to said link at a point offset from the link pivot axis when the link is in the first position to apply a torque to said link to maintain it in said first position and on the other side of said pivot axis when said link is in said second position to maintain the link in said second position.

3. A mower according to claim 1 wherein said force applying means comprises a second spring mounted between said seat and the mower and a cable connected to said link and to said seat, said second spring being adapted to normally hold said seat in a first position in which said cable is stressed to apply a force to move said link to said second position, said seat being movable by the weight of an operator to remove the stress in said cable and to remove the force applied to the link by said cable to permit the link to be moved into the clutch engaging position.

4. A mower according to claim 1 including an operating handle mounted on said link for manually pivoting said link between said first and second position.

5. A mower according to claim 1 wherein said clutch means comprises a plurality of spaced pulleys and means for drivingly interconnecting said pulleys, at least one of said pulleys being connected to said source of motive power and at least another of said pulleys being adapted to drive said cutting means, an idler pulley carried by said link, said means for drivingly interconnecting said pulleys being ineffective to transfer power between said pulleys when said idler pulley is out of contact with said interconnecting means and effective to transfer power between pulleys when said idler pulley is in contact with said interconnecting means.

6. A mower according to claim 5 wherein said means for drivingly interconnecting said pulleys is a V-belt, said idler pulley being adapted to contact said belt to cause the transmission of power between pulleys, the distance between said pulleys being such that the V-belt is loose on said pulleys when said idler pulley is out of contact with said belt and taut on said pulleys when said idler pulley is in contact with said belt.

7. In a self-propelled riding mower, having at least three wheels, motive power for driving at least one of said wheels, rotary cutting means carried by said mower and an operator's seat, a safety device for controlling the transmission of power to said cutting means comprising means movably mounting said seat on said mower, spring means mounted between said seat and said mower to normally hold said seat in a first position, said seat being movable to a second position under the weight of the operator and against the action of the spring, clutch means for coupling and decoupling the source of motive power and said cutting means, clutch operating means including an operating handle for moving said clutch means to engaged and disengaged positions to respectively couple and decouple said source of motive power and said cutting means, and means coupling said seat to said clutch operating means, the last said means being inactivated with said seat in said second position and activated for automatically moving the clutch operating means to the disengaged position upon movement of the seat to said first position.

8. In a self-propelled riding mower having a source of motive power, rotary cutting means, an operator's seat and clutch means for transmitting power to operate said rotary cutting means, the improvement comprising force applying means associated with said seat and said clutch means, said force applying means being operative to apply a force to disengage said clutch means when the operator is not in position on the seat and being inoperative to apply a force to said clutch means when the operator is in position on the seat whereby operation of said clutch means to transmit power is independent of said force applying means when an operator is on said seat.

* * * * *